United States Patent [19]

Sutton, Jr. et al.

[11] 3,908,358

[45] Sept. 30, 1975

[54] VARIABLE FLOW GAS GENERATING METHOD AND SYSTEM

[75] Inventors: Ernest S. Sutton, Jr., Newark, Del.; Eugene J. Pacanowsky, Elkton; Donald R. Reed, Warwick, both of Md.

[73] Assignee: Thiokol Corporation, Bristol, Pa.

[22] Filed: Jan. 31, 1973

[21] Appl. No.: 328,496

[52] U.S. Cl. ............... 60/39.03; 60/39.47; 60/207; 60/219; 60/254; 60/256
[51] Int. Cl. .......................... F02g 3/00; F02k 9/04
[58] Field of Search ......... 60/207, 218, 219, 39, 47, 60/253, 254, 256, 39.02, 39.03, 39.06, 39.46

[56] References Cited
UNITED STATES PATENTS

| | | | |
|---|---|---|---|
| 2,976,678 | 3/1961 | Kennedy | 60/39.47 X |
| 3,023,574 | 3/1962 | Clement et al. | 60/39.47 X |
| 3,026,672 | 3/1962 | Sammons | 60/219 |
| 3,031,842 | 5/1962 | Ledwith | 60/39.47 X |
| 3,065,597 | 11/1962 | Adamson et al. | 60/254 |
| 3,167,912 | 2/1965 | Ledwith | 60/254 X |
| 3,178,885 | 4/1965 | Loughran | 60/254 |
| 3,315,472 | 4/1967 | Moutet et al. | 60/253 |
| 3,460,348 | 8/1969 | Proell | 60/218 |
| 3,712,058 | 1/1973 | Cooper | 60/39.47 X |
| 3,724,217 | 4/1973 | McDonald | 60/254 |

*Primary Examiner*—Carlton R. Croyle
*Assistant Examiner*—Robert E. Garrett

[57] ABSTRACT

A method and apparatus for rapidly generating a controllably variable flow of motive gas at an elevated temperature and pressure in a gas generating system. The system comprises a driver gas generator containing a conventional gas generating composition, a demand gas generator containing a body of gas generating material that will support combustion only when exposed to an external source of thermal energy and means for conducting the hot driver gas through passages in the gas demand composition to cause the demand gas composition to burn and produce additional quantities of gas. The flow of driver gas through the demand gas composition is regulated to vary the total gas output of the system. A pressure relief valve communicates with the output of the driver gas generator and is set at a predetermined pressure above the delivery pressure of the system to permit the system to idle when the control valve is shut and the flow of driver gas through the demand gas generator ceases.

15 Claims, 6 Drawing Figures

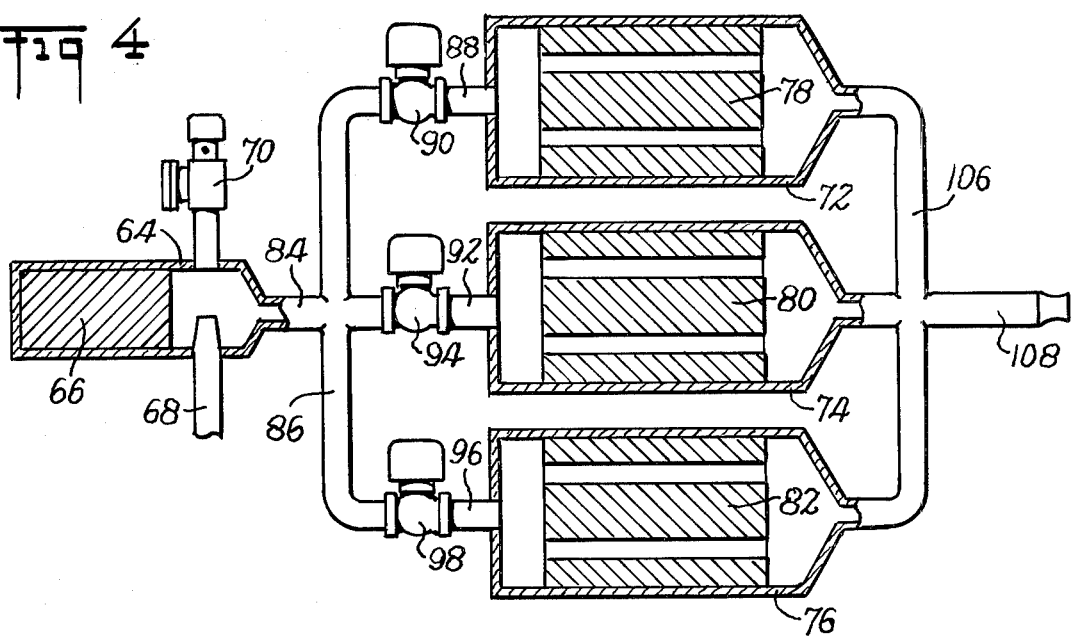
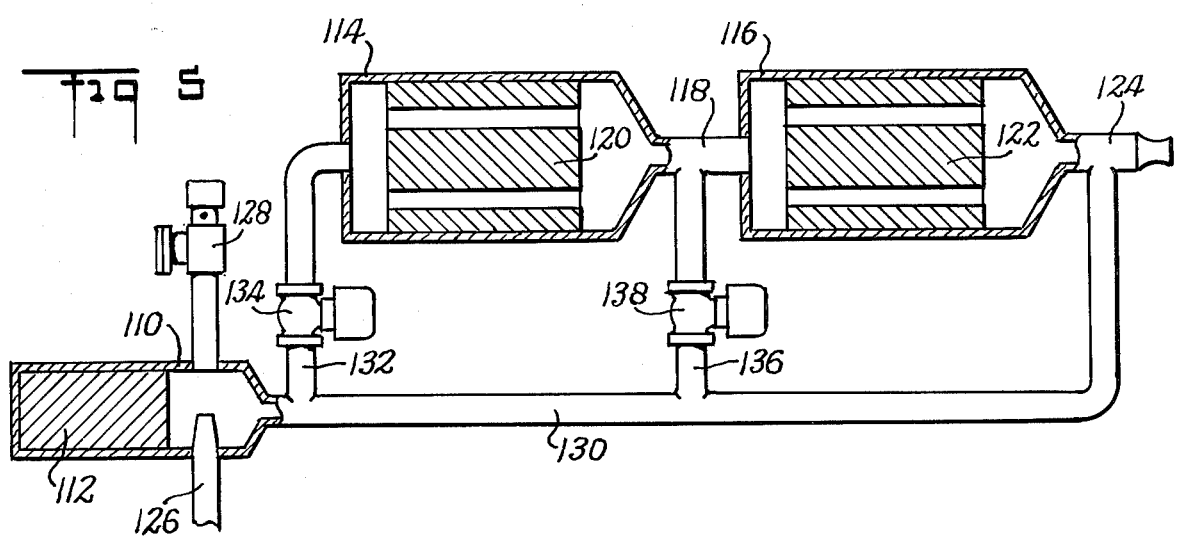
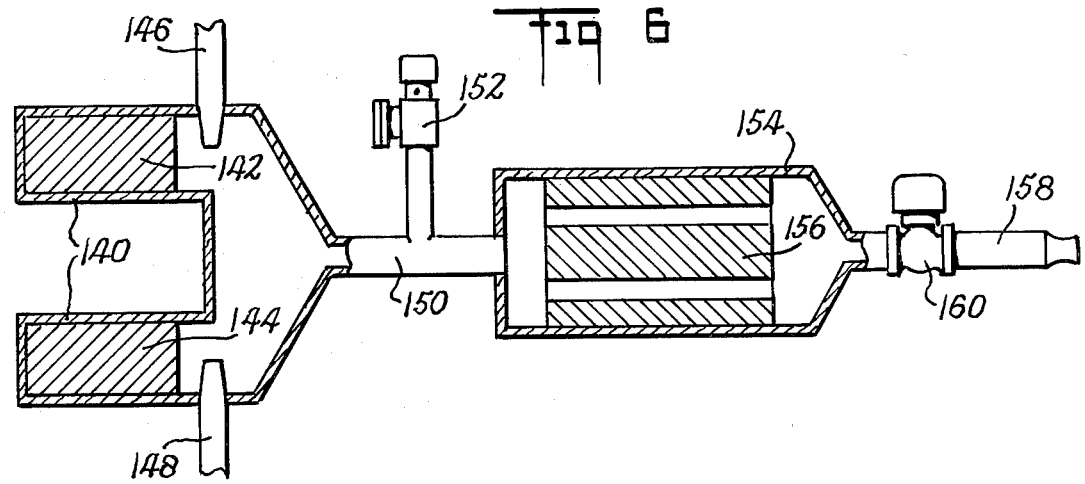

VARIABLE FLOW GAS GENERATING METHOD AND SYSTEM

This invention relates to gas generators and more particularly to a method and apparatus for rapidly generating a variable flow of motive gas.

Gas generators are portable, compact primary power units, often referred to as auxiliary power units, containing gas generating compositions which, when ignited, rapidly generate gases under pressure that can be used as motive power for a variety of mechanical applications. The gas generating compositions used in such gas generators are solid compositions that support and sustain combustion and product gases in the absence of atmospheric air. The gases thus produced can be used, for example, to pressurize a fluid or drive a turbine to produce mechanical or electrical energy, to actuate safety brakes on vehicles or to start various mechanical devices. Such gas generating devices are capable of producing a rather substantial amount of power per unit of weight as compared to conventional gas or oil energized generators. Because of their high power to weight ratio, these devices are especially suited for use in aerospace and missile applications.

In some respects, gas generating compositions are similar to solid propellant compositions used to power rockets and missiles. Like missile propellant compositions, gas generating compositions must fulfill certain stringent physical requirements to be acceptable. For example, like missile propellant compositions, gas generating compositions should be ballistically stable after prolonged storage at extreme temperatures ranging from as high as 180°F. to as low as —80°F. In addition, particularly for aerospace and missile applications, the compositions must be readily ignitable within these same temperature ranges. Furthermore, the compositions must be relatively insensitive to shock, have substantial elasticity to minimize gaps or voids and must burn evenly and consistently. Finally, both types of compositions consist essentially of an oxidizer and a combustible fuel-binder, ordinarily supplemented by minor quantities of various special purpose additives. It should be noted that the additives are optional components of the composition and will vary in type and content from composition to composition.

While as indicated above there are several areas of similarity between gas generating compositions and propellant compositions, the differences between the two types of compositions are quite important. Thus, gas generating compositions, unlike propellant compositions, should have a relatively slow burning rate and burn at relatively low flame temperatures. Another requirement is that the combustion of the gas generating compositions should desirably generate essentially particle free gasees that are relatively non-erosive. In addition, ideally the burning rate of the gas generating composition should be as independent as possible of the temperatures and pressures produced during composition. The need for these special requirements arises because of the different purposes for which the two compositions are designed. For example, the combustion of missile propellants produces exceedingly high flame temperatures, often in excess of 4000°F. These high flame temperatures are destructive to parts fabricated of the common commercial metal alloys such as the stainless steels over any sustained period of time. In fact, prolonged exposure to these higher temperatures produces deterioration of many of the specially formulated so-called "heat-resistant alloys." The erosion and corrosion of the metal missile parts that occurs during combustion is of little importance in missiles since they are designed as expendable "one-shot" pieces of hardware. Similarly, the presence of erosive or corrosive combustion products as evidenced by smoky combustion gases causes little concern.

In contrast, the effect of high combustion temperatures and erosive solid particles in the combustion gases on gas turbine-type engines is more serious. For example, the solid particles not only erode the metal parts they contact, but they can clog the movable parts of engines for which they are used as a source of motive fluid, thus impairing engine performance as well as causing engine failure. This increases maintenance costs and reduces useful engine life. Since power generating devices are designed for long term use, dependability and long life are important for commercial acceptance. Thus, the typical missile propellant composition of the prior art has little value as a gas generating composition.

Typical gas generator compositions have burning rates of the order of 0.05 to 0.3 inches per second at a pressure of 1000 p.s.i.a. and produce gases having temperatures below about 2500°F. The attainment of relatively low gas temperatures can be promoted by incorporating in the gas generating composition any of various known coolants.

One disadvantage to which conventional gas generators of the type referred to above are subject is that it has not been possible to regulate the flow of gas therefrom in a satisfactory manner. While the conventional gas generators of the prior art can be designed for a wide range of operating conditions and burning rates by varying the nature of the several ingredients of the gas generating composition, as well as the configuration of the gas generator, it has not been possible, once the generator composition is ignited, to vary the flow of output gas therefrom in a controlled and desired manner, as, for example, by stopping then re-starting the gas flow or substantially changing the gas flow during operation of the generator.

While a number of proposals have been made for overcoming this disadvantage of conventional gas generator compositions, these proposals, in general, have given rise to other disadvantages that limit their utility. For example, U.S. Pat. No. 3,460,348 discloses a gas generating system wherein the primary gas generating composition is designed to be incapable of supporting and sustaining combustion. Gas generation is effected by using an electrically heated grid which supports a combustion catalyst. When the heated catalytic grid is pressed against a surface of the gas generating composition, the desired generation of gas is obtained. Gas generation can be stopped by moving the grid out of contact with the gas generating composition. Gas generating systems of this type are subject to the disadvantage that a separate source of energy is required to energize the grid and that a considerable number of moving parts, which are exposed to the hot gas, are required to effect controllable movement of the grid relative to the gas generating compositions.

It is accordingly an object of the present invention to provide a gas generating method and system which rapidly generates a gas flow that is controllably variable in a relatively simple manner during operation of the gas generating system. It is another object of the invention to provide a relatively simple gas generating method and system wherein the flow of motive gas can be stopped and then re-started during operation of the gas generator. It is still another object of the invention to provide a gas generating method and system which permits regulation of the motive gas flow to achieve a relatively wide range of variation of the gas flow during operation of the gas generator. Other objects of the invention will be in part obvious and in part pointed out hereafter.

The objects and advantages of the present invention are achieved, in general, by utilizing in combination two different types of gas generating compositions designated for convenience herein as a "driver" composition and a "demand gas" composition. The driver composition is of a type conventionally used in gas generating compositions of the type referred to above and comprises an inorganic oxidizer, a combustible elastomeric fuel-binder and usually certain special purpose additives such as coolants, burning rate modifiers and the like. Such compositions, when ignited, burn in the absence of air and external sources of energy to produce gaseous combustion products. The "demand gas" composition may be generally similar to the driver gas composition but has incorporated therein a combustion suppressant in such proportions that it will generate gaseous combustion products only in the presence of an external source of thermal energy.

In operation the hot gaseous products from the driver gas composition are caused to flow in contact with a body of the demand gas composition to cause the latter composition to generate gases that supplement the flow of driver composition gases. The volume of gas generated by the demand gas composition depends upon such factors as the area of contact between the driver gas and the demand gas composition and the rate of flow and temperature of the driver gas. It has been found that by proper design the total gas flow from such a system may be as much as 10 to 20 times as great as the driver gas flow, and that by regulating the flow of driver gas in contact with the demand gas composition, predetermined output flows varying over a ratio of 10:1 or more may be obtained.

During any period subsequent to ignition of the driver gas composition when there is no requirement for gas production, the system is allowed to "idle," that is to say, the flow of driver gas in contact with the demand gas composition is shut off and the driver gas is permitted to escape from the system through a pressure relief valve set at a pressure above the desired gas delivery pressure of the system. When a demand for a particular flow of gas arises, a regulated amount of the driver gas is caused to flow in contact with the demand gas composition to produce a total gas output flow equal to the particular flow required.

The contact between the driver gas and the demand gas composition and the regulation of the gas flow in accordance with the invention may be achieved in a variety of ways. In order to point out more fully the various ways in which the method of the invention may be carried out, reference will now be made to the accompanying drawings which illustrate a number of systems embodying the apparatus invention and capable of being used to carry out the method of the invention.

In the drawings:

FIG. 4 shows a system wherein a single driver gas generator is connected to three demand gas generators arranged for parallel flow;

FIG. 5 shows a system comprising a driver gas generator and two demand gas generators interconnected for series parallel flow of gas; and FIG. 6 shows a system comprising two driver gas generators connected to a single demand gas generator.

Figure 1:
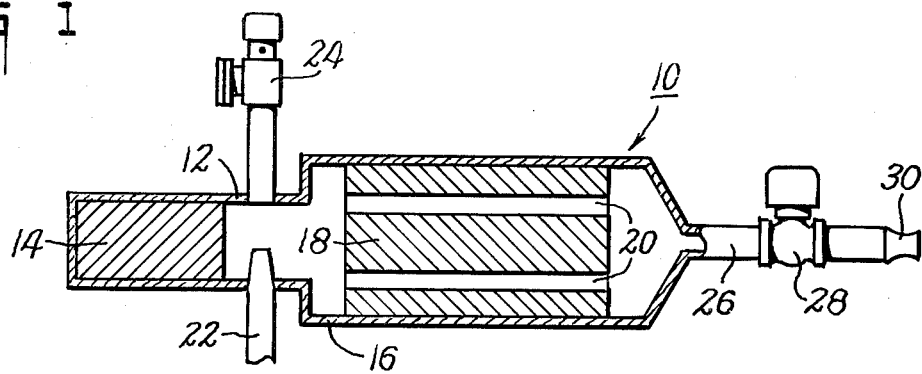
FIG. 1 shows a system wherein the driver gas composition and demand gas composition are located in a single casing, with the body of demand gas composition having longitudinal passages through which the driver gas may flow.

Referring to FIG. 1, the system there shown comprises a casing 10 having a first compartment 12 containing a body 14 of a driver gas composition and a second compartment 16 containing a body 18 of a demand gas composition. The body 18 of demand gas composition has the longitudinal passages 20 formed therein for gas flow therethrough.

Compartment 12 has a conventional igniter 22 extending through the wall thereof near the free face of the body 14 of driver gas composition. Communicating with the compartment 14 there is a pressure relief valve 24, the function of which is described below. At its right-hand or discharge end compartment 16 communicates with a discharge pipe 26 containing a valve 28 which is usually operated automatically by signals received from a remote point and which controls the gas output of the system. The discharge end of pipe 26 may be provided with a nozzle 30 in those cases where the gas generating assembly is to be used as a reaction motor.

As indicated above, gas generating systems of the type described herein are adapted to be used in applications where a lightweight gas generator capable of rapidly producing a large amount of gas is required. In operation, and assuming the valve 28 is initially closed, the igniter 22 is actuated to ignite the body 14 of driver gas composition. Since the driver gas composition is capable of supporting combustion in the absence of air or external source of energy, it burns continuously until it is used up. With valve 28 closed, the pressure within casing 10 rapidly builds up to the value for which relief valve 24 is set, e.g., 1000 to 1500 p.s.i., and the system then "idles" until a demand for gas occurs.

When a gas demand occurs, valve 28 is partially or completely opened, usually by remote control means (not shown) and hot driver gas flows through the passages 20 of the demand gas composition 18. These hot gases cause the demand gas composition to burn and produce a substantial amount of additional gas which, together with the driver gas, is discharged through pipe 26. It has been found that by causing the driver gas to pass in contact with the demand gas composition as shown, a total gas flow 10 times or more as great as the flow of driver gas can be achieved.

When the demand for gas ceases the valve 28 is closed and the flow of driver gas through passages 20 of body 18 ceases. Since the demand gas composition contains a combustion suppressant, gas generation by the demand gas composition ceases as soon as the flow of driver gas therethrough stops and the system returns to its idling condition wherein the driver gas is exhausted through the relief valve 24. Since the system idles at a relatively high pressure which is above the gas delivery pressure of the system, a very rapid response is obtained when the remote control means calls for a supply of gas by opening valve 28.

Figure 2:
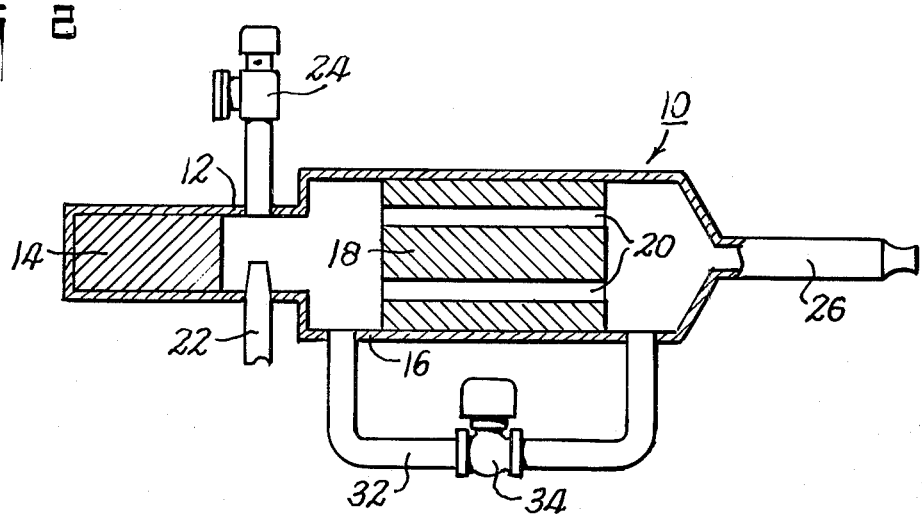
FIG. 2 shows a system generally similar to that shown in FIG. 1 but in which a regulated amount of driver gas is by-passed around a body of the demand gas composition.

Since the systems of FIGS. 2 to 6 operate in the same general manner as that of FIG. 1, only the differences in the systems will be pointed out. FIG. 2 illustrates a system capable of supplying a continuous but variable flow of gas. It includes a by-pass 32 around body 18 of demand gas composition and containing a regulating valve 34. By adjusting valve 34 the proportion of driver gas flowing through the gas demand composition 18 can be selectively changed to vary the gas output of the system.

Figure 3:
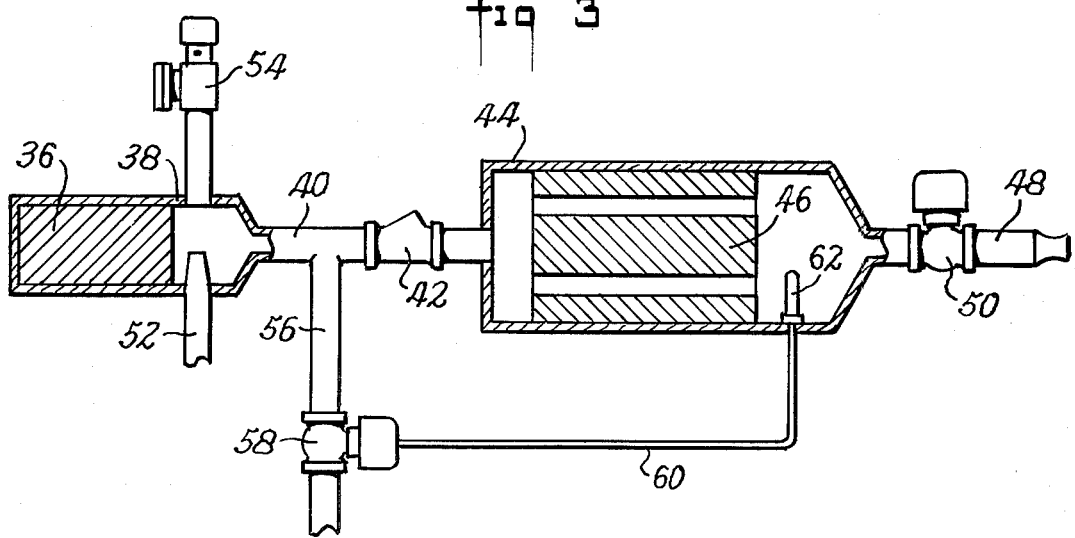
FIG. 3 shows a system generally similar to that of FIG. 1 but wherein the proportion of driver gas flowing through the body of demand gas composition is regulated to maintain a substantially constant pressure at the discharge end of the body of demand gas composition.

In the system of FIG. 3 the driver gas composition and gas demand composition are located in separate casings and a regulated proportion of the driver gas is exhausted from the system to maintain the gas delivery pressure substantially constant. More particularly, a body 36 of driver gas composition is positioned in a casing 38 which is connected by a pipe 40 containing a check valve 42 with a casing 44 containing a body 46 of demand gas composition. The gas discharge end of casing 44 communicates with pipe 48 containing control valve 50 and the casing 38 is provided with an igniter 52 and relief valve 54 like the corresponding parts of the system of FIG. 1.

Connected to pipe 40 there is a driver gas exhaust pipe 56 containing a regulating valve 58 which is connected by a conduit 60 to a pressure responsive element 62 located near the discharge end of casing 46. Element 62 and valve 58 cooperate to regulate the proportion of driver gas exhausted from the system through pipe 56 and to maintain the gas delivery pressure substantially constant irrespective of the degree of opening of valve 50.

Referring now to FIG. 4, the system there shown comprises a casing 64 containing a body of driver gas generating composition 66 and having an igniter 68 and relief valve 70 similar to the corresponding parts of FIG. 3. However, this system comprises three demand gas generating chambers connected for parallel flow, namely, casings 72, 74 and 76 containing respectively, the bodies 78, 80 and 82 of demand gas compositions. Casing 64 is connected by pipe 84 to a header 86 which is in turn connected by pipe 88 containing valve 90 to casing 72, by pipe 92 containing valve 94 to casing 74 and by pipe 96 containing valve 98 to casing 76. The discharge ends of casings 72, 74 and 76 are connected by pipes 100, 102 and 104, respectively, to discharge header 106 which in turn is connected to gas discharge pipe 108. The system of FIG. 4 permits the driver gas flow to be independently distributed to any or all of demand gas generating bodies 78, 80 and 82 and thus provides for an especially wide range of gas output flow variation.

Referring next to FIG. 5, the system there shown comprises a gas generator having a casing 110 containing a body 112 of driver gas composition and two casings 114 and 116 interconnected in series by pipe 118 and containing the bodies 120 and 122, respectively, of demand gas composition. Casing 116 is provided with a gas discharge pipe 124 through which gas under pressure leaves the system. The casing 110 is provided with the igniter 126 and relief valve 128. The discharge end of casing 110 is connected to a pipe 130 which at its other end is connected to discharge pipe 124. Pipe 130 is connected by branch pipe 132 containing regulating valve 134 to the inlet of casing 114 and by branch pipe 136 containing regulating valve 138 to the interconnecting pipe 118. The arrangement is such that a portion of the driver gas flows directly to the gas discharge pipe 124. By adjusting valves 134 and 138, the remainder of the driver gas may be caused to flow through either gas demand composition 120 or 122 alone or through both the gas demand compositions 120 and 122 to discharge pipe 124. Thus this system too provides for a relatively wide range of variation in the total gas output of the system.

Referring now to FIG. 6 of the drawings, the system of this Figure comprises two driver gas generators connected to a single demand gas generator. Thus the system comprises a casing 140 containing the two bodies 142 and 144 of driver gas generating composition provided with the separator igniters 146 and 148. Casing 140 is connected by pipe 150, which communicates with pressure relief valve 152, to casing 154 containing the body 156 of demand gas generating composition. Gases leave casing 154 through pipe 158 containing regulating valve 160. The operation of this system will be evident from the foregoing description. While the igniters 146 and 148 may be actuated simultaneously, a particular advantage of this system is that the two driver gas generating bodies 142 and 144 may be ignited in sequence to provide a driver gas flow extending over a relatively long period of time.

In FIGS. 1 to 6 the demand gas generating body or bodies are illustrated as having only two passages 20 extending therethrough. It is, of course, to be understood that the number, size and configuration of these passages may be varied to vary the area of contact with the driver gas flowing therethrough. Also the configurations of both the body of driver gas composition and the body of demand gas composition can be varied to modify the flow rates and times of the gases in the system.

As indicated above, the driver gas generating composition may be a conventional gas generating composition comprising essentially a finely divided inorganic oxidizer, e.g., ammonium perchlorate, an alkali metal or alkaline earth metal perchlorate such as sodium, potassium or lithium perchlorates or other oxidizer known to be useful in gas generator compositions and an organic fuel-binder. Usually such compositions also contain minor amounts of various special purpose ingredients including plasticizers such as alkyl phthalates and the like, darkening agents such as carbon black and various combustion catalysts and/or burning rate modifiers and/or coolants such as, for example, ammonium dichromate, dihydroxyglyoxime, cobalt dicyclopentadiene, ferric and cobalt acetonate and the like. The special purpose additives are optional components of the present compositions and may be present in the composition to the extent of say 0% to 10% by weight of the composition.

The fuel-binder may be formed from any of a wide variety of liquid polymers which are curable to elastomeric form and which are known to be useful in gas generators. As is known in the art, gas generator compositions are formulated by thoroughly mixing with the oxidizer and special purpose additives a liquid polymer and curing agent capable of curing the polymer to solid elastomeric form, and then heating the mixture to convert the liquid polymer to solid elastomeric form. The liquid polymer forming the basis of the fuel-binder may be, for example, a linear polyester, a carboxyl-terminatd linear aliphatic hydrocarbon, a hydroxyl-terminated linear aliphatic hydrocarbon, a linear epoxy resin, a polyurethane, a polythiopolymercaptan, a butadiene-acrylic acid copolymer, a butadiene-acrylonitrile copolymer, a polyacrylate, a polycarbonate or blends of such liquid polymers. In general, the oxygenated fuel-binders, e.g., the polyesters, give somewhat lower burning rates.

The carboxyl-terminated polyesters used as fuel-binders in the present compositions may be prepared in known manner by condensing dicarboxylic acids with diols under temperature and pressure conditions known in the art. Typical dicarboxylic acids useful in preparing the polyesters include oxalic, succinic, adipic, sebacic, maleic and fumaric acids and others, as well as mixtures of these acids. These diols used may include ethylene glycol, diethylene glycol, triethylene glycol, propylene glycol, polybutylene and polypropylene glycols, alkane diols, castor oil and the like. Minor amounts of polybasic acids such as itaconic and polyhydric alcohols such as glycerols, sorbitols and pentaerythritol may be included in the reaction mixture. The liquid polyesters preferably have a molecular weight of 500 to 5000.

The carboxyl-terminated aliphatic hydrocarbons may be carboxyl-terminated butadiene polymers prepared as described in Berenbaum U.S. Pat. No. 3,235,589 and may have a molecular weight within the range 500 to 10,000. The carboxyl-terminated acrylobutadiene copolymers may be prepared as disclosed in Lowrey et al. U.S. Pat. No. 3,595,717 and may have molecular weights within the range 1000 to 7000. The liquid polyurethane prepolymers may be prepared in known manner by reacting diisocyanates with carboxyl-terminated polyesters or polyethers, or known commercial types of liquid polyurethane polymers may be used. The liquid polythiopolymercaptans may be prepared as disclosed in U.S. Pat. No. 2,466,963 and may have molecular weights in the range 1000 to 5000. The liquid hydroxyl-terminated hydrocarbon polymers may be prepared as disclosed in U.S. Pat. No. 3,427,366.

The liquid prepolymers used as fuel-binders are cured according to curing techniques well known in the resin art using polymerization catalysts, curing agents or accelerators commonly used. For example, the polyesters may be cured at temperatures ranging from 80° to 180°F. using the usual curing agents such as polyepoxides, polyamines and the like. Similarly the polyurethane prepolymers can be cured at temperatures varying between ambient and 250°F. when treated with curing agents such as polyols. The carboxyl-terminated hydrocarbon polymers and acrylobutadiene copolymers such as the acrylic acid butadiene copolymers can be conveniently cured with polyepoxides, e.g., trifunctional epoxide resins based on p-amino-phenol, in known manner. Small amounts of curing catalysts of the metal salt type, e.g., iron, chromium, or stannous salts of linoleic or 2-ethyl hexanoic acid may be used in conjunction with the polyepoxide curing agent. The liquid polythiopolymercaptans can be cured with various oxidizing agents as disclosed in U.S. Pat. No. 2,466,963.

In general, the driver gas compositions comprise:

1. From 40% to 73% by weight of finely divided inorganic perchlorate oxidizer, preferably ammomium perchlorate,
2. From 10% to 35% of elastomeric combustible fuel-binder,
3. From 5% to 35% of a coolant, e.g., dihydroxyglyoxime, and
4. From 0 to 10% by weight of the special purpose additives referred to above.

In preparing the driver gas compositions the perchlorate oxidizer in finely divided form, the liquid fuel-binder and curing agent therefor, and the coolant, also in finely divided form, are placed in a mixer, and thoroughly mixed. The mixing time required to achieve the desired degree of uniformity varies according to the batch size and properties of the ingredients used such as the viscosity of the fuel-binder prepolymer, the nature of the curing agent, and particle size of the oxidizer and coolant. Ordinarily at least 30 minutes is required to achieve the desired uniformity. The mixed composition is introduced into a suitable casing, usually having a nozzle outlet, and is cured in situ in the casing at a temperature which in most cases falls within the range 80° to 200°F. The particular curing temperatures required to cure the liquid prepolymers described above are known in the art.

A typical driver gas generator composition may be made from the following formulation:

Formulation I

| Ingredient | Parts by Weight |
| --- | --- |
| Carboxyl-terminated hydrocarbon polymer (average molecular weight about 4000) HC 434 | 21.0 |
| Curing Agent - triglycidyl ether of p-aminophenol (ERL-0510) | 0.6 |
| Curing Agent - tri[1-(2-methyl)aziridinyl-1] phosphine oxide (MAPO) | 0.6 |
| Iron octoate (curing catalyst) | 0.3 |
| Ammonium perchlorate | 77 |
| Dihydroxyglyoxime (coolant) | 25 |

The foregoing formulation is thoroughly mixed, cast in a suitable casing and cured in situ for 72 hours at 150°F.

As indicated above, the demand gas composition differs from the driver gas composition in that it contains a combustion suppressant which causes it to generate gases only when exposed to a source of thermal energy such as the hot driver gas. The inorganic oxidizer, fuel-binder and special purpose additives may be any of the types described above in connection with the driver gas composition. Suitable combustion suppressants include oxamide, semi-carbazide, glycine, melamine, 5-aminotetrazole and ammonium sulfate.

In most cases the various ingredients of the demand gas composition desirably fall within the following ranges of proportions in percentages by weight:

| Ingredient | Percent by Weight |
| --- | --- |
| Inorganic oxidizer | 40% to 70% |
| Fuel-binder | 10% to 35% |
| Combustion suppressant | 15% to 35% |
| Special purpose additives | 0 to 10% |

Illustrative demand gas generating compositions may be prepared by using the ingredients set forth in Formulations II to IV below in the indicated parts by weight.

| Formulation II | |
| --- | --- |
| Ingredient | Parts by Weight |
| Diethylene glycol adipate polyester Molecular Weight about 2000 | 24.94 |
| Triglycidyl ether of p-aminophenol (Curing agent) | 1.31 |
| Diaminophenyl s-trazine (stabilizer) | 1.0 |
| Carbon black (Thermax) | 0.25 |
| Oxamide (combustion suppressant) | 27.0 |
| Ammonium perchlorate | 45.5 |

The foregoing ingredients were thoroughly mixed and the fuel-binder cured to elastomeric form by heating for 72 hours at 150°F.

| Formulation III | |
| --- | --- |
| Ingredient | Parts by Weight |
| Diethylene glycol adipate polyester Molecular weight about 2000 | 24.75 |
| Triglycidyl ether of p-aminophenol | 1.25 |
| Diaminophenyl s-triazine | 1.0 |
| Carbon black | 0.5 |
| Ammonium perchlorate | 48.5 |
| Semi-carbazide (combustion suppressant) | 25.0 |

The foregoing ingredients were thoroughly mixed and the fuel-binder cured to elastomeric form by heating for 72 hours at 150°F. Compositions wherein the semi-carbazide was replaced by glycine, melamine and 5-aminotetrazole also gave satisfactory results.

| Formulation IV | |
| --- | --- |
| Ingredient | Parts by Weight |
| Liquid carboxy-terminated hydrocarbon polymer (HC-434) | 22.69 |
| Triglycidyl ether of p-aminophenol (curing agent) | 1.18 |
| Chromium octotate (curing catalyst) | 0.03 |
| Ammonium sulfate (combustion suppressant) | 21.0 |
| Ammonium perchlorate (oxidizer) | 55.0 |
| Carbon black (opacifier) | 0.1 |

The foregoing ingredients were thoroughly mixed and the liquid carboxy-terminated polymer was cured to elastomeric form by heating the mixture for 96 hours at 135°F.

From the foregoing description it should be apparent that the present invention provides a method and apparatus for rapidly generating a controllable flow of motive gas capable of achieving the objectives set forth at the beginning of the specification. The embodiment of FIG. 1 is especially simple and effective in its operation since it includes only a single control valve located at the discharge end of the demand gas generator. A wide range of gas flows can be obtained by adjusting this valve. Moreover, when the valve is shut off, the system idles at a relatively high pressure determined by the setting of the pressure relief valve and thus when a demand for gas flow causes the control valve to be opened, a very rapid response is achieved. The embodiments of FIGS. 2 to 6 have modified structures that enable them to satisfy the requirements of a variety of different applications.

It is, of course, to be understood that the foregoing description of FIGS. 1 to 6 of the drawings and Formulations I to IV of the gas generating compositions are intended to be illustrative only and that numerous changes can be made therein without departing from the scope of the invention.

We claim:

1. A method for rapidly generating a controllably variable flow of motive gas at an elevated temperature and pressure in a gas generating system which comprises establishing at least one body of a combustion supporting gas generating material comprising a combustible elastomeric fuel-binder and an inorganic oxidizer in such proportions as to be capable, when ignited, of supporting and sustaining combustion of said material in the absence of air and external energy, establishing at least one body of a non-combustion supporting combustible gas generating material comprising a combustible elastomeric fuel-binder and an inorganic oxidizer in such proportions as to be capable, when ignited, of supporting and sustaining combustion, and a combustion suppressant in such proportions that said body of non-combustion supporting gas generating material will produce gaseous combustion products only in the presence of an external source of thermal energy, igniting said body of said combustion supporting gas generating material to cause it to produce hot gaseous combustion products, passing at least a portion of said combustion products over a body of said non-combustion supporting gas generating material to cause it to produce additional gaseous combustion products and regulating the proportion of gaseous products from said combustion supporting body passed into contact with said non-combustion supporting body to control the total gas output of said system.

2. A method according to claim 1 wherein the combustion products of said combustion supporting body are caused to flow through a plurality of passages in said body of non-combustion supporting material.

3. A method according to claim 2 wherein the flow of combustion products through said body of non-combustion supporting material is regulated between said body of combustion supporting material and said body of non-combustion supporting material.

4. A method according to claim 2 wherein the flow of combustion products through said body of non-combustion supporting material is regulated after passage of the combustion products through said body of non-combustion supporting material.

5. A method according to claim 1 wherein the combustion products from a single body of combustion supporting material is caused to flow in contact with a plurality of bodies of non-combustion supporting material.

6. A method according to claim 5 wherein the combustion products from the body of composition supporting material is caused to flow in parallel in contact with said plurality of bodies of non-combustion supporting material.

7. A method according to claim 5 wherein the combustion products from said combustion supporting material are caused to flow in series in contact with said plurality of non-combustion supporting bodies.

8. A method according to claim 1 wherein the combustion products from a plurality of bodies of combustion supporting materials are caused to flow in contact with a body of said non-combustion supporting material.

9. A method according to claim 1 wherein the combustion products from a plurality of bodies of combustion supporting materials are caused to flow in contact with a plurality of bodies of non-combustion supporting material.

10. A method according to claim 1 wherein a portion of the combustion products from a body of combustion supporting material flows through a body of non-combustion supporting material and the remainder of the combustion products from said body of combustion supporting material is caused to by-pass said body of non-combustion supporting material and is mixed with the combustion products leaving said body of non-combustion supporting material.

11. A method according to claim 1 wherein a portion of the combustion products produced by the combustion supporting gas generating material is exhausted from the system and the flow of thus exhausted combustion products is regulated in response to the pressure at the discharge end of the body of non-combustion supporting gas generating material to maintain said pressure substantially constant.

12. A gas generator system for rapidly generating a controllably variable flow of gas at an elevated temperature and pressure comprising, in combination, a gas generating vessel having a first and second compartment, said first compartment containing a combustion supporting gas generating material comprising a combustible elastomeric fuel-binder and an inorganic oxidizer in such proportions as to support and sustain combustion of said material in the absence of air and external energy when said material is ignited to form combustion products, said first compartment having an outlet for said combustion products, said second compartment having a gas inlet and a gas outlet and containing a body of gas generating material comprising a combustible elastomeric fuel-binder, an inorganic oxidizer and a combustion suppressant in such proportions that said second gas generating material will not support combustion in the absence of an external source of thermal energy, the gas inlet of said second compartment communicating with the gas outlet of said first compartment, ignition means in said first compartment for igniting the body of gas generating material therein to produce combustion products that flow through the body of gas generating material in said second compartment, a pressure relief valve communicating with said first compartment and adapted to be preset to a pressure above the delivery pressure of said system, and valve means for regulating the flow of combustion gases through the body of material in said second compartment to regulate the total gas output of said system.

13. A gas generator system for rapidly generating a controllably variable flow of gas at an elevated temperature and pressure comprising at least one driver gas generating vessel having a gas outlet and containing a body of gas generating material comprising a combustible elastomeric fuel-binder and an inorganic oxidizer in such proportions as to support and sustain combustion of said material in the absence of air and external energy when said material is ignited to form combustion products, at least one demand gas generating vessel having inlet and outlet openings and containing a body of gas generating material comprising a combustible elastomeric fuel-binder, an inorganic oxidizer and a combustion suppressant in such proportions that said material will support and sustain combustion only when exposed to an external source of thermal energy, conduit means for connecting the gas outlet of said gas generating vessel or vessels with the gas inlet or inlets of said demand gas generating vessel or vessels, each of said driver gas generating vessels containing an igniter for igniting the gas generating material therein, a pressure relief valve communicating with said conduit and adapted to be set at a pressure above the gas delivery pressure of said system, and valve means for regulating the flow of gas through said demand gas generator vessel or vessels to regulate the total gas output of said system.

14. A gas generator system according to claim 13 wherein a single driver gas generating vessel and demand gas generating vessel are used and said valve means is located at the outlet of said demand gas generating vessel to control the total gas output of said system and cut off the gas output when desired.

15. A gas generating system according to claim 13 including a gas exhaust conduit for exhausting gas from said conduit means, an exhaust gas regulating valve in said gas exhaust conduit and pressure sensing means at the outlet of said demand gas generating vessel, said exhaust gas valve being responsive to the pressure measured by said pressure sensing means to maintain the pressure at the outlet of said demand gas generating vessel substantially constant.

* * * * *